United States Patent [19]
Asano et al.

[11] Patent Number: 5,032,929
[45] Date of Patent: Jul. 16, 1991

[54] DOCUMENT READING DEVICE

[75] Inventors: Junichi Asano; Yoshio Tabata; Norio Kanemitsu, all of Kawasaki, Japan

[73] Assignee: Fujitsu Limited, Kawasaki, Japan

[21] Appl. No.: 604,643

[22] Filed: Oct. 29, 1990

[30] Foreign Application Priority Data

Apr. 25, 1988 [JP] Japan .................. 63-102268

[51] Int. Cl.$^5$ .................. H04N 1/17; H04N 1/00
[52] U.S. Cl. ................... 358/448; 358/404; 358/439; 358/296
[58] Field of Search .......... 358/437, 486, 488, 494, 358/474, 448, 443, 450, 497, 452, 404, 405, 403, 407, 435, 436, 439, 296

[56] References Cited

U.S. PATENT DOCUMENTS

| 4,631,596 | 12/1986 | Yaguchi | 358/464 |
| 4,672,460 | 6/1987 | Tsuda | 358/457 |
| 4,712,139 | 12/1987 | Kato | 358/280 |

FOREIGN PATENT DOCUMENTS

| 0113016 | 7/1984 | European Pat. Off. | 358/461 |
| 58-71764 | 4/1983 | Japan . | |
| 58-71765 | 4/1983 | Japan . | |
| 58-170169 | 10/1983 | Japan . | |
| 58-205372 | 11/1983 | Japan . | |
| 59-50663 | 3/1984 | Japan . | |
| 59-110269 | 6/1984 | Japan . | |
| 0084680 | 5/1985 | Japan | 358/474 |
| 0154768 | 8/1985 | Japan | 358/448 |
| 0154770 | 8/1985 | Japan | 358/448 |
| 63-131673 | 6/1986 | Japan . | |
| 61-208965 | 9/1986 | Japan . | |

Primary Examiner—Edward L. Coles, Sr.
Assistant Examiner—Jerome Grant, II
Attorney, Agent, or Firm—Staas & Halsey

[57] ABSTRACT

A document reading device suitable for use for a personal computer, a facsimile, and a work station or the like, and comprises a reading means for reading the image information provided on a manuscript, a read controlling means for controlling the reading means in such a way that when the reading operation of the reading means is interrupted while reading said manuscript, a predetermined amount of the image information read by the reading means immediately before said interruption occurred, can be reread after the reading operation is restarted, and a processing means for processing both groups of the image information duplicately read by the reading means before and after the interruption thereof, respectively, by modifying them in such a way that a portion of the image information finally output and based upon the image information read by the reading means before the interruption, and another portion of the image information finally output and based upon the image information read by the reading means after the interruption, can be connected to form a continuous configuration. By using this device, an unnatural configuration of reproduced image caused by the interruption of the reading operation and by the restart thereof, can be eliminated.

8 Claims, 6 Drawing Sheets

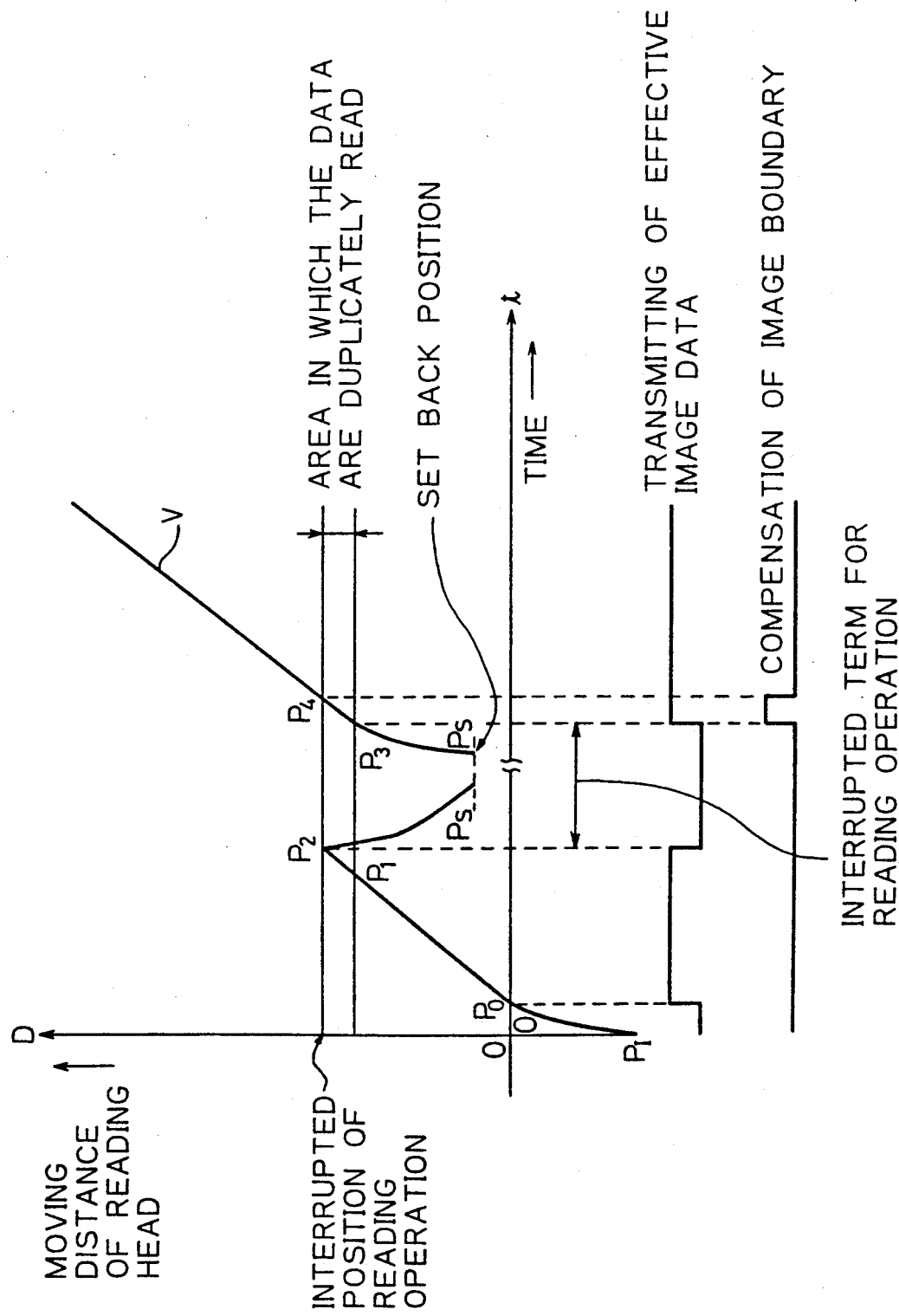

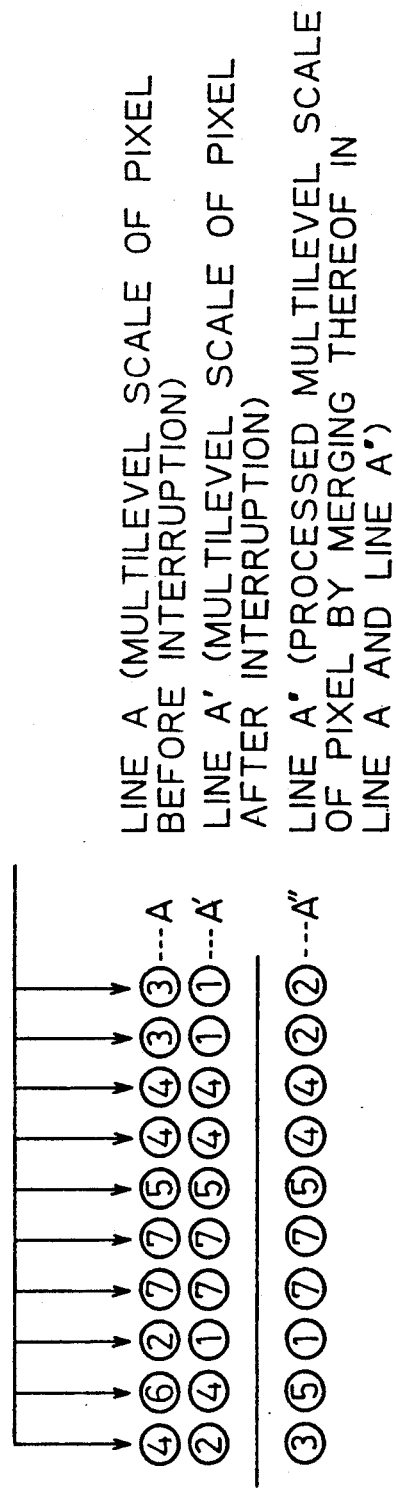

DOCUMENT READING DEVICE

This is a continuation of co-pending application Ser. No. 07/342,818 filed on Apr. 25. 1989.

BACKGROUND OF THE INVENTION

1. Field of the Invention

This invention relates to a document reading device and especially relates to for example a document reading device connected to a personal computer or a work station.

2. Description of the Related Art

As a technological development in information processing engineering, a system for transmitting image information read by an image reading device to a host computer, such as a personal computer, a work station or the like to process the image is currently used.

In the reading operation of such an image reading device, the amount of information read by said image reading device is large compared with the capacity of memory provided in the host computer, therefore the reading operation of the reading means in the reading device is sometimes stopped while scanning manuscript.

Once the operation of the reading means is stopped, the processing of the image information in the host computer will be advanced to restart the reading operation thereof when the transmission of the information becomes possible, and the reading operation can be continued thereafter.

However, when the reading operation is stopped, on restarting the reading operation, it is difficult to restart the reading operation at the exact position at which the reading operation was stopped, due to the transient characteristics of the driving system.

To overcome this problem, the same assignee as that of this invention had already proposed a vertical scanning method in the specification of the Japanese Unexamined Patent Publication No. 61-131673.

In this method, before restarting the reading operation, the driving system for the reading means is set back at a predetermined distance taking the transient characteristics of the driving system into the account, and the reading operation is started again from that position.

However, in the conventional method as explained above, there are many cases in which the position from which the reading operation is restarted after the driving system for the reading means is set back, taking the transient characteristics of the driving system into the account, does not necessarily coincide with the position at which the reading operation was interrupted.

If such a situation occurs, a discontinuous portion of the final image information will be generated at the position at which the reading operation was interrupted, thereby causing the image information thus reproduced to be incorrect.

SUMMARY OF THE INVENTION

The present invention was created with these problems in mind and the object of the invention is to provide a document reading device in which erroneous reproduction of image information obtained by the reading means before an interruption in the reading operation and that obtained after the interruption can be eliminated.

To attain the object of the invention, the document reading device of this invention has a technological construction such that the device comprises a reading means for reading the image information provided on a manuscript, a read controlling means for controlling the reading means in such a way that when the reading operation of the reading means is interrupted while reading the manuscript, a predetermined amount of the image information read by the reading means immediately before the interruption occurred, can be reread after the reading operation is restarted, a processing means for processing both groups of image information read by said reading means before and after said interruption of the reading operation by modifying them in such a way that the image information finally output is based on the image information read by said reading means before and after said interruption, can be connected to from a continuous configuration.

DESCRIPTION OF THE DRAWINGS

FIG. 4 is an explanatory drawing illustrating the variation of the position of the reading head with respect to the time lapse, FIG. 6 is an explanatory drawing illustrating the result obtained by processing of image information in this invention.

DESCRIPTION OF THE PREFERRED EMBODIMENTS

Figure 1:
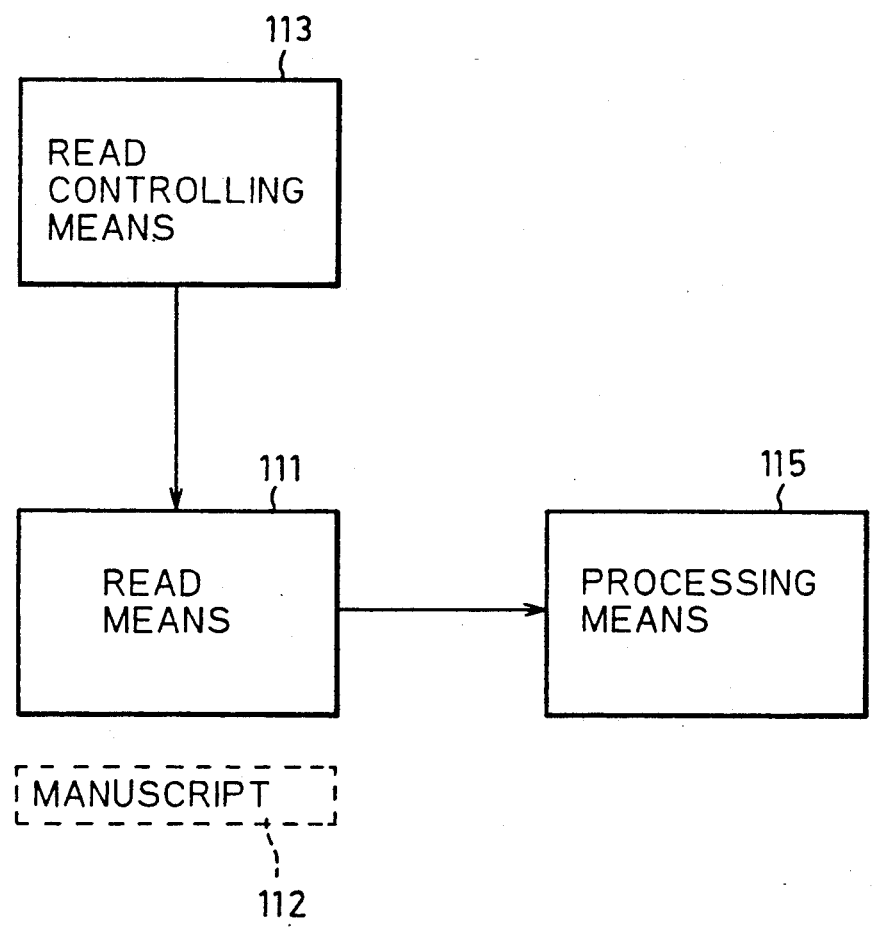
FIG. 1 is a theoretical block diagram of the document reading device of this invention.

FIG. 1 is a theoretical block diagram of the document reading device of this invention.

In FIG. 1, a reading means 111 reads documents such as the image information, i.e., the characters written on a sheet of paper or the like as a manuscript 112.

A read controlling means 113 controls the reading means 111 in such a way that when the reading operation of the reading means 111 is interrupted while reading a document written on the manuscript, a predetermined amount of the image information read immediately before the interruption occurred, can be reread after the reading operation is restarted.

A processing means 115 processes both groups of image information reread by the reading means 111 before and after the interruption thereof by modifying them in such a way that the image information finally output based on the image information read by the reading means before and after the interruption, can be connected to form a continuous configuration.

Accordingly, in this invention, the document reading device is configured in such a way that when the reading operation of the manuscript is interrupted, a predetermined amount of the image information included in at least one horizontal scanning line for example, read by the reading means immediately before the interruption occurred, is again reread when the reading operation is restarted to obtain final image information having a continuous configuration using the image information read by the reading means before and after the interruption of the reading operation occurs.

The operation of the present invention will be described below.

In this invention, the reading means 111 reads image information and the read controlling means 113 controls the reading means 111 in such a way that when the reading operation of the reading means 111 is interrupted while reading a manuscript, a predetermined amount of image information included in at least one scanning line for example, read by the reading means immediately before the interruption occurred, is reread when the reading operation is restarted.

The processing means 115 processes both groups of image information read by the reading means 111 before and after the interruption thereof respectively, by modifying them in such a way that a portion of the image information finally output based on the image information read by the reading means before and after the interruption, can be connected to form a continuous configuration.

Therefore in this invention, even when the reading operation of the manuscript is interrupted, a predetermined amount of the image information read by the reading means immediately before the interruption occurred, can be reread when the reading operation is restarted by controlling the read controlling means 113 and both the image information read by the reading means before and after the interruption can be processed to produce final image information having a continuous configuration of the image information read by the reading means before and after the interruption thereby an erroneous image configuration of the image information obtained by processing the information read before and the interruption can be eliminated.

The preferred embodiments of this invention will be explained below with reference to the attached drawings.

Figure 2:
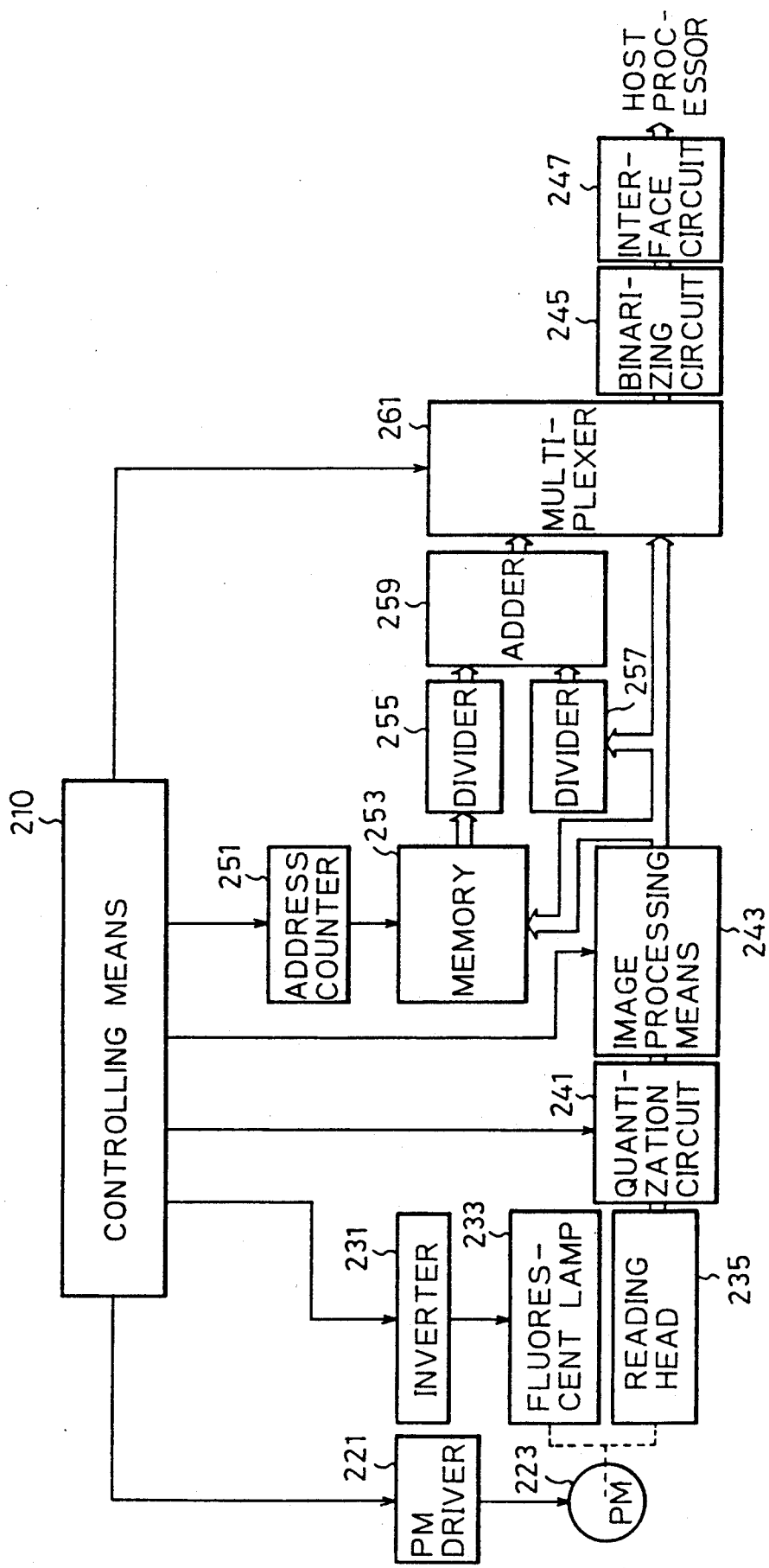
FIG. 2 is a block diagram indicating the construction of one embodiment of the document reading device of this invention.

FIG. 2 shows a one embodiment of the document reading device of this invention.

Before explaining FIG. 2, the relationship between the embodiment shown in FIG. 2 and each component shown in FIG. 1 is illustrated as follows;

The reading means 111 in FIG. 1 is corresponds to a group comprising a pulse motor driver 221, a pulse motor 223, an inverter 231, and a fluorescent lamp 233 as shown in FIG. 2.

The read controlling means 113 in FIG. 1 corresponds to a controlling means 210 as shown in FIG. 2.

The processing means 115 in FIG. 1 corresponds to a group comprising the controlling means 210, an address counter 251, a memory 253, the dividers 255 and 257, and an adder 259 as shown in FIG. 2.

Therefore, the specific embodiment of this invention will be explained below as an embodiment having the relationship between FIG. 1 and 2 as mentioned above.

In FIG. 2, the document reading device of this invention is provided with a reading head 235 for reading documents including image information, i.e., characters comprising for example, literature, symbols, drawings, photographs or the like, written on the paper as the manuscript, an inverter 231, a fluorescent lamp 233, a pulse motor 223 for moving the fluorescent lamp 233 and the reading head 235 to scan the manuscript, a pulse motor driver 221 for driving the pulse motor 223, a quantization circuit 241 for quantizing the image information read by the reading head 235, an image information quantized by the quantization circuit 241, memory 253 for storing the image information therein, an address counter 251 for deciding the address of the storing position of the image information in the memory 253, dividers 255 and 257 for dividing the image information input thereinto by 2, an adder 259 for processing the information input thereinto with an adding operation, a multiplexer 261 for selecting the information input thereinto, a binary circuit 245 for converting the multi level information into the binary information, an interface circuit 247 for exchanging the information with the host processor and a controlling portion 210 which controls the whole system of this invention.

In this invention, the reading head 235 comprising the reading means 111 consists of at least one line of a sensor array in which a plurality of sensors receiving image information are arranged in a line along the width-wise direction of a manuscript, and each sensor can read the image information, i.e., the documentary information written on the manuscript in accordance with every pixel thereof and the information thus read by the reading means is converted into the image information represented by one of a plurality of multilevel scales through the quantization circuit 241.

In this invention, the plurality of multilevel scales may consist of 64 levels, for example.

In reading the image information, each sensor scans from one end of the line to other using a suitable circuit to read the image information in the line as one reading unit.

The system for this scanning operation along with one line of the sensor array is called a horizontal scanning system.

The reading head is moved along the longitudinal direction of the manuscript with a suitable pitch for reading the whole manuscript. Accordingly, the system for this longitudinal movement of the reading head is called a vertical scanning system.

As apparent from the above explanation, the reading operation in this invention is controlled by both horizontal scanning system and a vertical scanning system for reading the whole manuscript.

Namely, in this invention, the reading operation is controlled by driving the vertical scanning system, and the interruption and the restarting of the reading operation is controlled by stopping the driving of the vertical scanning system and restarting the driving the vertical scanning system respectively.

The controlling signal output from the controlling means 210 is applied to the pulse motor driver 221 and thereafter the controlling signal output from the pulse motor driver 221 is applied to the pulse motor 223.

The controlling signal output from the controlling means 210 is applied to the inverter 231 and thereafter the signal output from the inverter 231 is applied to the fluorescent lamp 233.

The controlling signal output from the controlling means 210 is applied to the address counter 251 and then the address data output from the address counter 251 is applied to the memory 253 to designate the storing position in the memory of the image information supplied thereto.

The memory 253 used in this invention serves as a storage for the predetermined image information read by the reading means immediately before the interruption of the reading operation to process the information as described later without transmitting it directly to the host processor.

The controlling signal output from the controlling portion 210 is applied to the quantization circuit 241, the image information processing means 243 and the multiplexer 261 respectively The image information read by the reading head 235 is input into the quantization circuit 241 and then the image information output from the quantization circuit 241 is applied to the image information processing means 243.

Further, the image information output from the image information processing means 243 is input into the memory 253, the divider 257 and the multiplexer 261 respectively.

The image information output from the memory 253 is input into the divider 255 and the image information output from the divider 255 and 257 respectively is input into the adder 259.

The image informations output from the adder 259 is input to the multiplexer 261, and the image informations output from the multiplexer 261 is input to the binarizing circuit 245 and the image information output from the binary circuit 245 is input to the interface circuit 247. The image informations output from the interface circuit 247 is applied to the host processor such as a personal computer or the like.

The pulse motor 223 drives the reading head 235 and the fluorescent lamp 233.

The operation of the document reading device of this embodiment of the invention will be explained below with reference to FIGS. 2 to 4.

Figure 3:
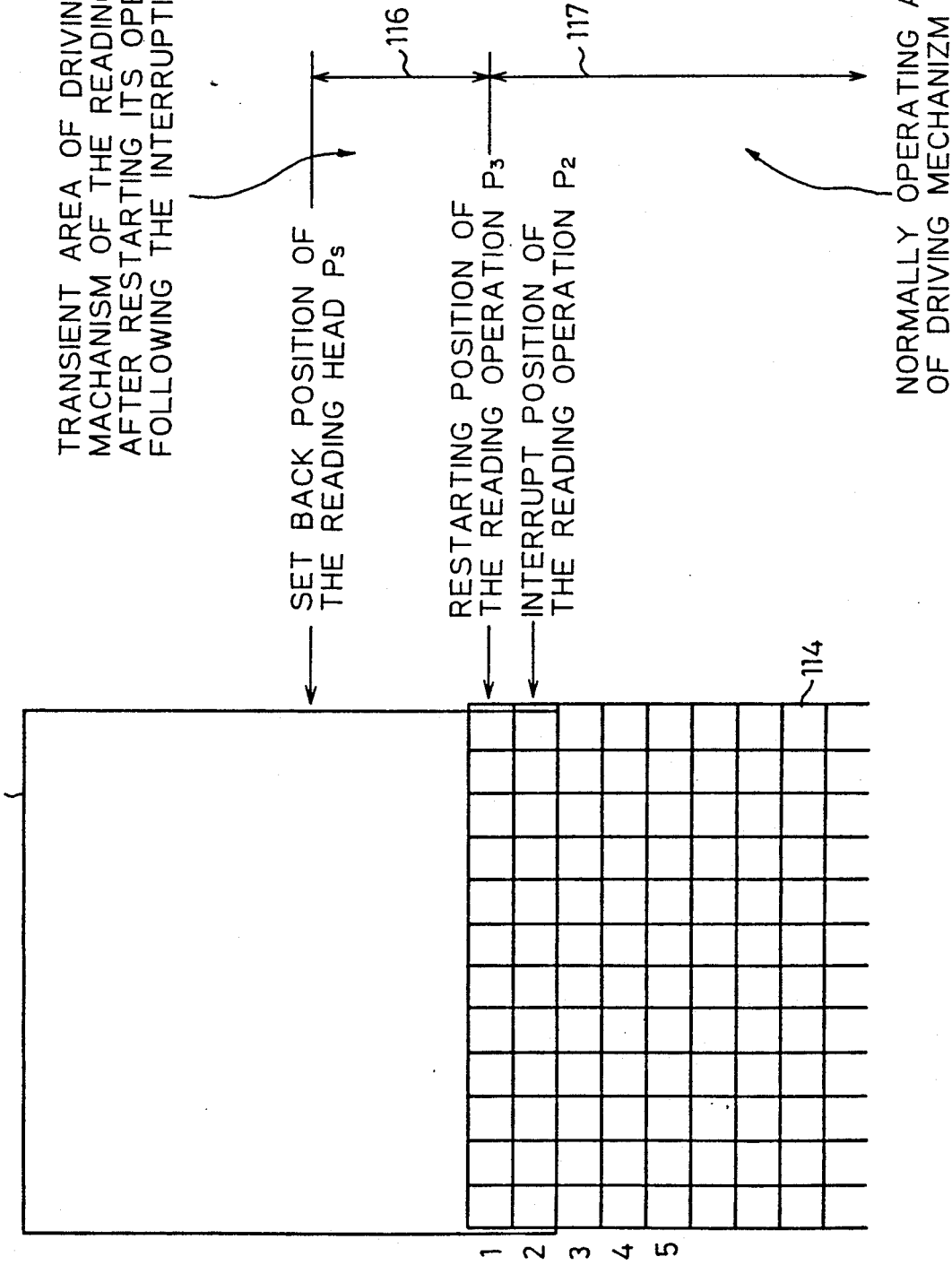
FIG. 3 is an explanatory drawing illustrating the relative position of the reading head to the image information.

FIG. 3 shows the position of the reading head with respect to the image information, and FIG. 4 shows the variation of the position of the reading head with respect to the time lapse.

After receiving a read command from the host processor, the controlling means 210 starts to drive the pulse motor 223 through the pulse motor driver 221 so that the fluorescent lamp 233 and the reading head 235 both of which being mechanically connected to the pulse motor 223, are moved to the initially set position $P_I$ to starting reading.

The vertical scanning operation of the reading head 235 with the horizontal scanning operation carried out simultaneously therewith, is started from the position $P_I$ initially set above, though the actual reading operation for reading the documents written on the manuscript 112 is not yet started, and meanwhile, the fluorescent lamp 233 is turned ON by receiving the signal output from the inverter 231.

After the scanning speed of the reading head 235 reaches at a predetermined speed, the reading operation for reading the documents, i.e., the image information written on the paper as the manuscript, is started at point $P_O$ as shown in FIG. 4.

Note that, in this invention, the reading means is driven by a suitable mechanism and therefore it will usually take a predetermined time for the speed of the reading means to reach predetermined speed due to inertia.

Therefore, during the time when the speed of the reading means was not reached the predetermined speed, i.e., the transient time 116 of the reading means indicated by $P_I$-$P_O$ in FIG. 4, the reading operation is not actuated.

As mentioned above, when a reading operation is carried out normally after the reading operation is started, the image information read by the reading means for every pixel 114 as shown in FIG. 3, is first transmitted to the quantization circuit 241 to have the analog information converted to digital information and thereafter the image information thus digitized is processed in the image information processing means 243 with, for example, the process of enlarging or reducing the image.

While the lines having the numeral figure more than 2 are representing the pixels which will be scanned after the line 2 is scanned. The image information thus processed in the image information processing means 243 is supplied to the binary circuit 245 through the multiplexer 261. When the reading operation is normally carried out the multiplexer 261 selects the signals output from the image information processing means 243 with the controlling signal output from the controlling portion 210 and thereby the image information consisting the multi-level data transmitted to the binary circuit 245 is converted into binary data. The image information converted into binary data is then transmitted to the host processor through the interface circuit 247. The operation of the device of this invention while the reading operation is normally going on, is as explained above. Next, assuming a situation in which the image information cannot be transmitted due to receiving the command from the host processor. When receiving such a command, the controlling portion 210 stops the pulse motor 223 in accordance with the command and thereby the scanning operation of the reading head 235 is stopped, and simultaneously the reading operation of the manuscript is interrupted.

At this time, the controlling means 210 serves to control the system mentioned above in such a way that a predetermined amount of image information, for example, the image information corresponding to two scanning lines 1 and 2 as shown in FIG. 3, which are read by the head 235 between the time $P_1$ and $P_2$ as shown in FIG. 4, is not transmitted to the host processor, but is stored in the predetermined area in the memory 253 designated by the address counter 251.

Namely, this image information is temporarily stored in the memory for further processing.

The controlling means 210 then sets the reading head 235 and the fluorescent lamp 233 back to the position $P_S$ determined in such a manner as to read the predetermined image information, i.e., the image information corresponding to two scanning lines of the reading head 235, again taking the transient characteristics of driving system into account, and in this situation, the controlling means 210 is waiting to receive the command to allow the information to be transmitted to the host processor.

When the controlling means 210 receives the command to allow the information to be transmitted to the host processor, it starts to drive the pulse motor 223 again and thereby the reading head 235 and the fluorescent lamp 233 start to move.

However, in this invention, as the reading head 235 is previously set back to the position $P_S$ determined as explained above, the reading operation is not started until the scanning speed of the reading head 235 reaches the predetermined normal speed.

This transient period as mentioned above is illustrated in FIG. 4 as a line $P_S$-$P_3$ during which time the reading operation is not actuated.

When the scanning speed of the reading head 235 reaches the predetermined normal speed at the position $P_3$, the reading operation is started again to read the image information starting from the two scanning lines 1 and 2 as mentioned above and reread these lines. This situation is illustrated in FIG. 4 as a line $P_3$–$P_4$.

Accordingly, when the image information corresponding to the first line is initially read by the reading head 235, the image information will be transmitted to the divider 257, while the image information corresponding to one or two lines previously read by the reading head 235 and stored in the memory 253, is simultaneously read out therefrom to be transmitted to the divider 255.

Image information corresponding to the first line transmitted to the divider 255 and 257 respectively is processed in each divider 255 and 257 by dividing it by 2 and thereafter the image information in each divider corresponding to the first line is transmitted to the adder 259 to be added together.

The adder 259 serves as a means for merging the image information processed in the dividers 255 and 257.

The image information corresponding to the first line added in the adder 259 is input to the multiplexer 261. At this time, as the multiplexer 261 is controlled in such a way that the input signal input from the adder 259 is output therefrom in accordance with the controlling signal output from the controlling portion 210, the image information corresponding to the first line added in the adder 259 is input to the binary circuit 245 corresponding to the controlling signal above.

Finally the image information corresponding to the first line input to the binary circuit 245 is binarized thereat and transmitted to the host processor through the interface circuit 247.

After that, when the image information corresponding to the second line is read by the reading head 235, it is transmitted to the divider 257 in the same manner as the first line thereof, while the image information corresponding to one of the two lines read later by the reading head 235, i.e., the image information corresponding to the last line out of two lines, stored in the memory 253, is simultaneously read out therefrom to be transmitted to the divider 255.

Thereafter, the image information is processed in the same manner as mentioned above to be divided at the divider 255 and 257, added together in the adder 259 and transmitted to the host processor through the multiplexer 261, the binary circuit 245 and the interface circuit 247.

As explained above, in this embodiment, the image information corresponding to 2 scanning lines read after the reading operation is started, is processed with the image information corresponding to 2 scanning lines read immediately before the interruption of the reading operation utilizing the process of geometric mean and the processed data is transmitted to the relevant device.

The effect of processing the image information utilizing the method of geometric mean in this invention will be explained below with reference to FIG. 6.

The line A shows a line of one reading unit of the image information read by the reading head before the interruption occurs and the line A' shows the same line as above read after the reading operation was restarted. Each circle shown in each line represents the position of the pixel and the numeral enclosed in the circle represents the value of the multilevel scale of each pixel.

The line A" shows the resulting line of the image information processed by the method of this invention and each pixel has a respective multilevel scale value which is obtained by merging the values obtained before and after the interruption on the same pixel.

The image information corresponding to the third line and successive lines read by the reading head 235 after the reading operation is restarted can be transmitted to the host processor in the normal manner because the multiplexer 261 is controlled to output the signal input from the image information processing means 243 by the controlling signal output from the controlling means 210.

In this invention, when the reading operation is interrupted, a predetermined amount of image information for example that corresponding to at least one scanning line or preferably two scanning lines, of the reading head 235 which is a final scanning line, or lines read by the reading means such as the reading head 235 immediately before the interruption of the reading operation, are stored in the memory 253.

The reading head 235 and the fluorescent lamp 233 are then set back to the position from which the reading head 235 starts to move to the reading position for reading the image information corresponding to the 2 lines, for example, and the location thereof being determined in such a way that the reading head 235 can reach the normal scanning speed by the time it comes to the reading position as mentioned above, and thereafter the reading operation is restarted.

The image information corresponding to the first two lines for example, read by the reading head 235 after the reading operation is restarted, is transmitted to the host processor after being processed with the image information corresponding to 2 lines for example, stored in the memory 253, utilizing the process of geometrical mean.

Consequently, even when an interruption of the reading operation occurs the incorrect image resulting from processing the image information obtained by the reading means before the interruption of the reading operation and that after the interruption, can be eliminated.

The difference between the final image obtained by the present invention and that of obtained by the conventional art will be explained below with reference to FIG. 5A–5C.

Figures 5A, 5B, 5C:
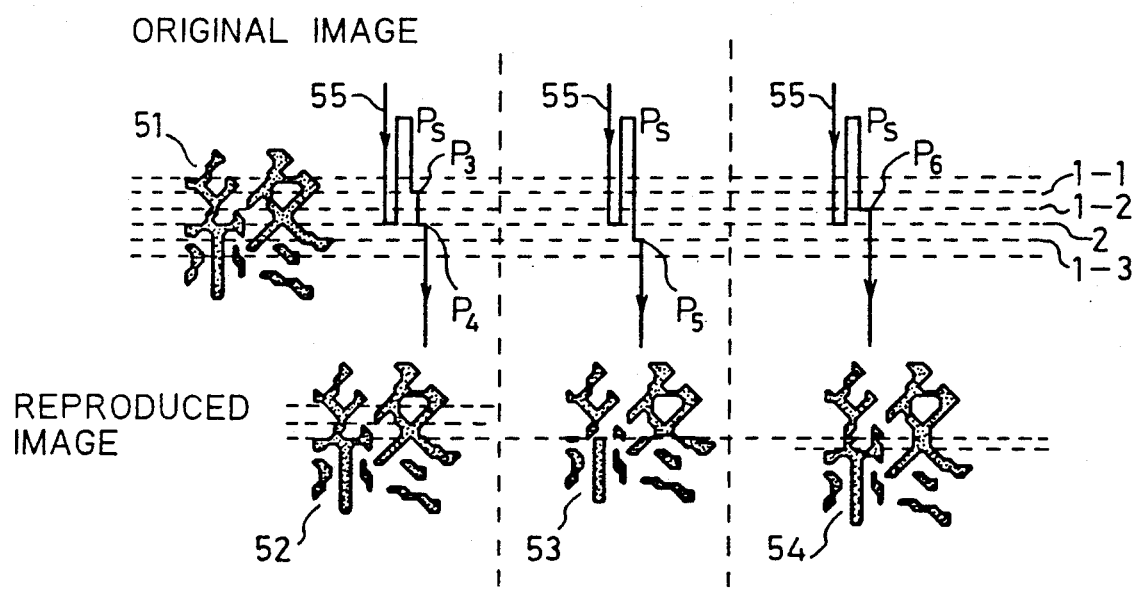
FIG. 5a, 5b, 5c are an explanatory drawing illustrating the effect of this invention compared with the final image information obtained by the conventional system.

In FIG. 5A–5C, for example, an original character 51 is written on the manuscript and it is now assumed to have been read by the reading head and an interruption of the reading operation has occurred at line 2.

In conventional method, the reading head is set back to the scan reverse position $P_S$ as shown in the tracing line 55, and when the reading operation is restarted, the reading head will be advanced to the line 2 which is a target line for restarting the reading operation, although in one case as shown in FIG. 5B, the reading head is advanced to the line 1–3 beyond the line 2 with the reading head still being held in an inactuated condition, and then the reading operation is actuated from the line shown as $P_5$.

However, in this case, the image information read by the reading head before the interruption occurred was already transmitted to the host processor, and on the other hand, the image information read after the reading operation was restarted, was obtained from the point $P_5$ on the line 1–3 and this image information thus obtained is immediately transmitted to the host processor, and therefore one line of the image information will be shortened whereby a final character 53 having one line of the image information omitted therefrom is obtained as shown in FIG. 5B.

On the other hand, in another case in the conventional method as shown in FIG. 5C, the reading head is set back to the scan reverse position $P_S$ as shown in the tracing line 55, and when the reading operation is restarted, the reading head is advanced only to the line 1-2 which is one line before the target line 2 for restarting the reading operation, with the reading head still being held in an inactuated condition, and then the reading operation is actuated from the point $P_6$ on the line 1-2.

However, in this case, the image information read by the reading head before the interruption occurred was already transmitted to the host processor and on the other hand, the image information read by the same after the reading operation was restarted, was obtained from the point $P_6$ on the line 1-2 and this image information thus obtained is also immediately transmitted to the host processor, and therefore one line of the image information will be excessive whereby the final character 54 having one extra line of the image information is obtained as shown in FIG. 5C.

But in the present invention as shown in FIG. 5A, the image information corresponding to a plurality of lines read by the reading head immediately before the interruption had occurred, for example the image information existing between the line 1-1 and line 2, is stored in the memory and is not immediately transmitted to the host processor, and on restarting the reading operation, the operation is restarted from the point $P_3$ to read overlappingly the same information as already read before the interruption, and thereafter both groups of information are merged and processed to make a combined image, and this information thus processed is transmitted to the host processor to be reproduced as the final character.

The final character 52 thus treated in this invention is shown in FIG. 5A.

According to this invention, in order to compensate the discontinuity between the image information obtained before the interruption and that obtained after the restart of the reading operation, the same area of the image information is read before and after the interruption and both groups of information are merged to be processed to reproduce modified image information so that the reproduced image corresponding to the line of the image information on which the interruption occurred, is turned to be vague not to be identified to eliminate the erroneously reproduced image.

In this embodiment of the invention, the hardware circuitry is used as an operation method in the processing means alternatively, this kind of the processing operation can be carried out utilizing certain software with the use of a microprocessor or the like.

And further in this embodiment, the processing method of the geometric mean is explained as the processing means for processing the image information to eliminate any unnatural characteristic from the final image information alternatively, any method for obtaining the mean of data such as the method of the arithmetic mean, the geometric mean, and the harmonic mean or the like can be utilized.

Moreover, in this embodiment, the image information corresponding to one scanning line or two scanning lines is reread by the reading head 235 before and after the interruption of the reading operation alternatively, the image information corresponding to more than 2 scanning lines may be reread by the reading head 235.

Further, in this embodiment, the control of the vertical scanning system to perform the reading operation is carried out by moving the reading means such as the reading head 235, though it may be carried out by moving the paper, i.e., the manuscript, instead of moving the reading means.

According to the present invention, when a reading operation of documents written on a paper or the like is interrupted due to the control of the controlling means, the document reading device of this invention is constructed in such a way that a predetermined the amount of the image information read by the reading means immediately before the interruption occurred, is again reread, and after the reading operation is restarted and the image information thus obtained is processed to produce final image information having a continuous configuration at the image information read by the reading means before the interruption of the reading operation occurs, and after the interruption, can be eliminated making the document reading device of this invention remarkably useful from a practical usage point of view.

We claim:

1. A document reading device which comprises:
    reading means for reading image information provided on a document,
    read controlling means for controlling said reading means and for causing said reading means to overlappingly reread a predetermined amount of said image information read by said reading means immediately before an interruption in the reading operation of said reading means after said interruption;
    storing means for storing a part of both said image information read before said interruption and said image information read after said interruption and for outputting stored image information after the reading operation of said reading means is restarted, said stored image information including a part of both said image information read before said interruption and said image information read after said interruption;
    processing means for processing said stored image information and for correctly concatenating a portion of said image information based upon the image information read by said reading means before said interruption and another portion of the image information based upon the image information read by said reading means after said interruption to form a continuous configuration, said processing means includes merging means for producing merged image information by modifying said stored image information.

2. A document reading device according to claim 1, wherein said stored image information includes at least one line of information which has been read by the reading means and said read controlling means includes:
    horizontal scanning means for scanning in a horizontal direction;
    vertical scanning means for scanning in a vertical direction; and
    means for driving said vertical scanning means in steps corresponding to one scanning line of said horizontal scanning means.

3. A document reading device according to claim 2, wherein said read controlling means includes:
    means for controlling said interruption by stopping said driving of said vertical scanning means and for controlling said restart by starting said driving of said vertical scanning means.

4. A document reading device according to claim 2 or 3, wherein said vertical scanning means includes:
means for moving said reading means in the vertical direction.

5. A document reading device according to claim 2 or 3, wherein said vertical scanning means includes:
means for moving said manuscript.

6. A document reading device according to claim 1, 2 or 3, wherein said reading means includes:
means for reading said image information pixel by pixel, and for assigning each pixel a multilevel scale value.

7. A document reading device according to claim 1, wherein said merging means includes:
means for calculating a mean of said stored image information.

8. A document reading device according to claim 7, wherein said merging means includes:
means for calculating a mean of the multilevel scale value of a pixel of said stored image information.

* * * * *